United States Patent
Li et al.

(10) Patent No.: US 10,809,753 B2
(45) Date of Patent: Oct. 20, 2020

(54) REAL-TIME SIMULATOR AND CONTROLLER OF POWER SYSTEM USING DISTRIBUTED DATA STREAMING SERVER

(71) Applicant: University of Tennessee Research Foundation, Knoxville, TN (US)

(72) Inventors: Fangxing Li, Knoxville, TN (US); Hantao Cui, Knoxville, TN (US); MohammadReza AhmadzadehRaji, Knoxville, TN (US); Kevin Louis Tomsovic, Knoxville, TN (US); Yilu Liu, Knoxville, TN (US); Jian Huang, Knoxville, TN (US)

(73) Assignee: UNIVERSITY OF TENNESSEE RESEARCH FOUNDATION, Knoxville, TN (US)

( * ) Notice: Subject to any disclaimer, the term of this patent is extended or adjusted under 35 U.S.C. 154(b) by 228 days.

(21) Appl. No.: 15/457,428

(22) Filed: Mar. 13, 2017

(65) Prior Publication Data
US 2018/0259989 A1      Sep. 13, 2018

(51) Int. Cl.
G05F 1/66       (2006.01)
G06F 30/20      (2020.01)
G06F 119/06     (2020.01)

(52) U.S. Cl.
CPC .............. *G05F 1/66* (2013.01); *G06F 30/20* (2020.01); *G06F 2119/06* (2020.01)

(58) Field of Classification Search
CPC ...... G05F 1/66; G05B 13/041; G06F 17/5009
See application file for complete search history.

(56) References Cited

U.S. PATENT DOCUMENTS

| | | | | |
|---|---|---|---|---|
| 2002/0078028 A1* | 6/2002 | Lisanke | ................ | G06F 9/5027 |
| 2007/0100478 A1* | 5/2007 | Egeland | ........... | G05B 19/41865 |
| | | | | 700/45 |
| 2011/0153712 A1* | 6/2011 | Whetsel | ................ | G06F 16/258 |
| | | | | 709/201 |
| 2012/0022713 A1* | 1/2012 | Deaver, Sr. | ............ | G05B 17/02 |
| | | | | 700/298 |
| 2014/0001847 A1* | 1/2014 | Khandelwal | .............. | H02J 3/14 |
| | | | | 307/11 |
| 2014/0074311 A1* | 3/2014 | Kearns | ...................... | H02J 3/24 |
| | | | | 700/297 |
| 2016/0043549 A1* | 2/2016 | Beauregard | ............ | G05B 13/04 |
| | | | | 700/286 |

* cited by examiner

*Primary Examiner* — Thomas C Lee
*Assistant Examiner* — Anzuman Sharmin
(74) *Attorney, Agent, or Firm* — Myers Bigel, P.A.

(57) ABSTRACT

Systems and methods for simulating and controlling a power system in real time, using a controller, are provided. The controller includes a simulation layer to simulate an operation of the power system, a disturbance generation layer to provide data to the simulation layer to disturb the simulated operation of the power system, an application layer to display the simulated operation of the power system and generate a control signal to control, based on the simulated operation of the power system, at least one element of the power system, and a distributed data streaming server ($D^2S^2$) to allow interoperability among the simulation layer, the disturbance layer, and the application layer.

14 Claims, 2 Drawing Sheets

REAL-TIME SIMULATOR AND CONTROLLER OF POWER SYSTEM USING DISTRIBUTED DATA STREAMING SERVER

STATEMENT REGARDING FEDERALLY SPONSORED RESEARCH OR DEVELOPMENT

This invention was made with government support co-funded by the National Science Foundation (NSF) and the Department of Energy (DOE) under the NSF award number EEC-1041877. The U.S. Government has certain rights in this invention.

BACKGROUND

The present disclosure generally relates to electrical power systems. More specifically, the present disclosure relates to real-time simulation and control of electrical power systems.

Simulation finds application in operations of electrical power systems, commonly referred to as power grids. Operators of power grids run simulations to plan and schedule generation, transmission, and distribution of electrical energy in a safe and reliable manner. Additionally, operators use static and time-domain simulations to study the behavior and stability of power grids following hypothetical, but plausible, disturbances or contingencies such as loss of a generator unit or a transmission line. Such simulations allow the operators to devise remedial actions in anticipation of the actual occurrence of one of these hypothetical disturbances.

Historically, power system simulations, which are generally based on numerical integration approaches including explicit methods (e.g., Forward Euler and Runge-Kutta) or implicit methods (e.g., Trapezoidal and Backward Euler), have been computationally expensive and time-consuming due to the complexity of simulation models that can accurately represent the power grids. Consequently, operators have been running offline simulations of their power grids or sections of their power grids. For example, as best industry practices, some operators simulate thousands of predefined contingencies every five to fifteen minutes in order to be prepared to remediate one of the predefined contingencies if it were to occur in the next five to fifteen minutes.

With advances in technology, numerical integration methods, and/or modeling of power systems, the computational power and time required to simulate the state, operation, and behavior of power grids have been decreasing significantly, to a point at which simulating power grids in real time or faster than real time is becoming plausible. Simulating power grids in real time or faster than real time may drastically improve operators' situational awareness and empower them to anticipate effects that a predefined or instantaneous contingency may have on their power grids and accordingly take, in a timely fashion, the most appropriate corrective action to mitigate any undesirable effects, such as blackouts.

To enable the capabilities and efficacies of real-time simulations, it is essential for devices and software packages used for power system simulations, data storage, control, visualization, etc. to timely and reliably interoperate. However, these different devices and software packages typically use proprietary data formats and communication protocols, making interoperability practically impossible.

Therefore, the inventors recognized a need in the art for systems and methods for seamless data transfer among simulation platforms, databases, control systems, visualization tools, etc. to allow for real-time or faster-than-real-time simulation and control of power systems.

DETAILED DESCRIPTION

The present disclosure relates to real-time simulation and control of power systems using a distributed data streaming server ($D^2S^2$) (hereinafter the "server"). The server may handle data communication to enable real-time simulation of power systems and may link various simulation and application modules to collectively mimic the continuous operation and control of the power systems. A modular design may provide the added advantage of allowing for independent development and extensibility of the overall design.

The server software architecture will be described herein with a logic and functional design of a multi-terminal, bidirectional data streaming server and its clients, and a program workflow design to illustrate how simulation data may be streamed in real time or faster than real time and how a power system may retrieve and/or respond to control signals dynamically. The server may provide the capability of handling connections, broadcasting messages, and sending data, and a set of client software tools that allow for importing perturbations, triggering control algorithms, changing device set points, etc. in real time or faster than real time.

The server architecture may provide a common data exchange format for linking power system model data and simulation results from existing power system simulation tools to assessment, control, and visualization modules, which may or may not be from existing commercial simulation tools. These assessment, control, and visualization modules may be developed independently following the common data exchange format. Examples of exchanged information include timestamp, state/algebraic variable name and value, destination module name, etc. The common data exchange format may be simulation tool-independent, allowing for the assessment, control and visualization modules to be used without modification when switching between different simulation tools.

Embodiments of the present disclosure provide systems and methods for simulating and controlling a power system in real time, using a controller, are provided. The controller may include a simulation layer to simulate an operation of the power system, a disturbance generation layer to provide data to the simulation layer to disturb the simulated operation of the power system, an application layer to monitor the simulated operation of the power system and generate a control signal to control, based on the simulated operation of the power system, at least one element of the power system, and a $D^2S^2$ to allow interoperability among the simulation layer, the disturbance layer, and the application layer.

Figure 1:
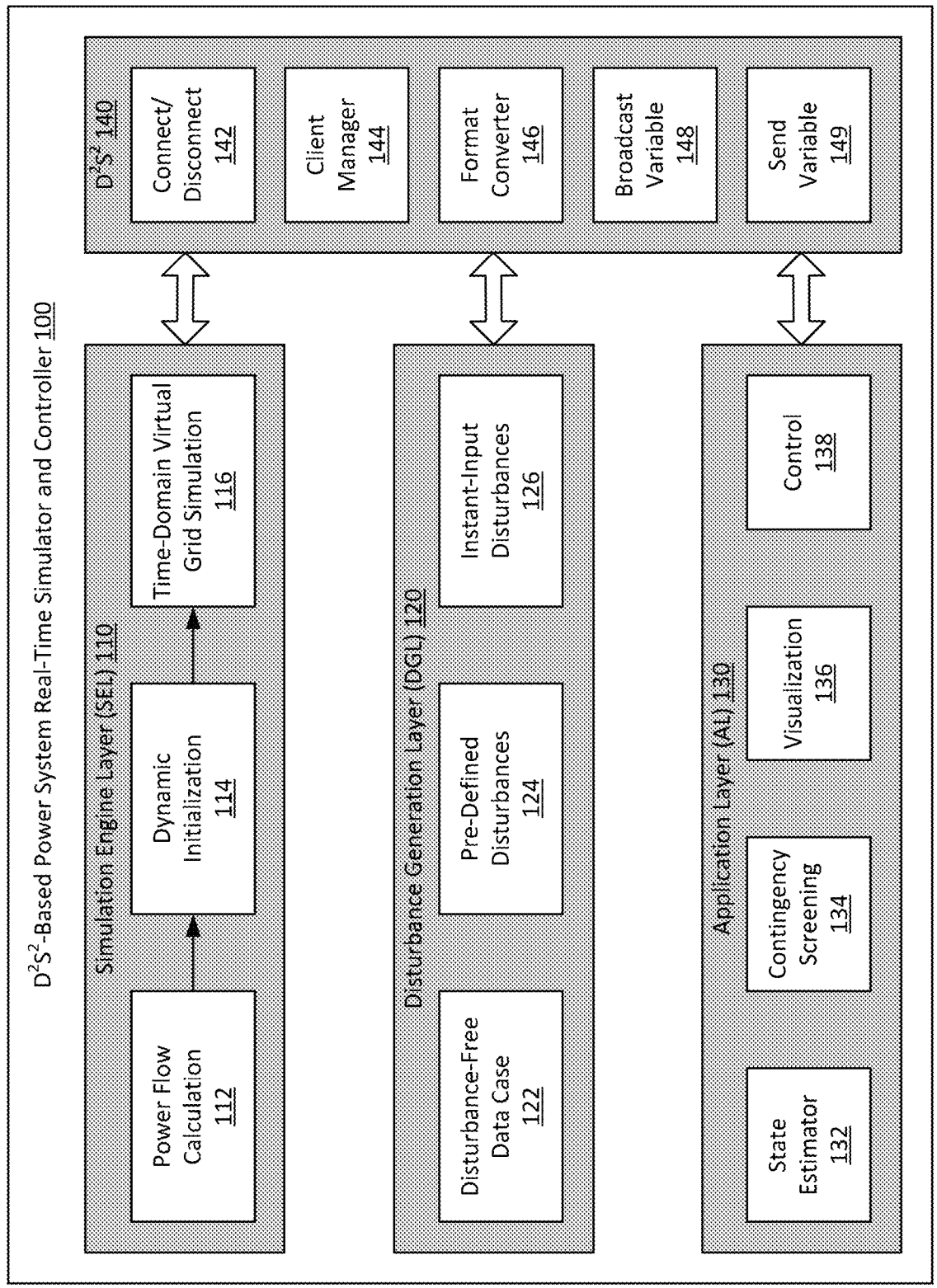
FIG. 1 depicts a distributed data streaming server ($D^2S^2$)-based power system real-time simulator and controller according to an embodiment of the present disclosure.

FIG. 1 depicts a $D^2S^2$-based power system real-time simulator and controller 100 (hereinafter the "controller 100"), according to an embodiment of the present disclosure. As can be seen in FIG. 1, to mimic the real-time operation of an actual power system, the controller 100 may be designed with a distributed architecture which consists of four layers. Namely, the controller 100 may include, but is not limited to, a simulation engine layer (SEL) 110, a disturbance generation layer (DGL) 120, an application layer (AL) 130, and a distributed data streaming server ($D^2S^2$) 140 (hereinafter, the "server 140"). The controller 100 may be accessed through a graphical user interface (GUI), allowing an operator and/or a user of the power system to manipulate one or more of a plurality of modules of the four layers.

The SEL 110 may include of a power flow calculation module 112, a dynamic initialization module 114, and a time-domain virtual grid simulation module 116. The SEL 110 continuously simulates and/or mimics the real-time operation of a power system. The SEL 110 may receive information/data from either the DGL 120 or the AL 130. The SEL may provide information/data it generates to the AL 130.

The power flow calculation module 112 typically performs static simulations of the power system based on predefined initial conditions, i.e., starting points for state variables of the power system, to provide a snapshot of the state of the power system. The predefined initial conditions and the number of state variables depend on the topology of the power system. Thus, under contingency conditions (e.g., loss of generator, transmission line, etc.), the topology of the power system changes and so do the initial conditions and the number of state variables. Accordingly, the power flow calculation module 112 may run at regular intervals and/or whenever a contingency in the actual power system is recorded.

The output of the power flow calculation module 112 may be provided, either at regular time intervals and/or whenever the output changes, to the dynamic initialization module 114. The dynamic initialization module 114 may in turn provide the output, which represents the state of the power system, to the time-domain virtual grid simulation module 116. The dynamic initialization module 114 may also store the output data in a database (not shown), which may be accessed on demand.

The time-domain virtual grid simulation module 116 may then use the information from the dynamic initialization module 114 as initial conditions to perform a continuous time-domain simulation of the power grid in real time or faster than real time. As such, whenever a predefined or an actual contingency occurs, the time-domain virtual grid simulation module 116 may indicate whether or not the power system will remain stable or not. Further, if and/or when operators take remedial actions, the power flow calculation module 112, the dynamic initialization module 114, and the time-domain virtual grid simulation module 116 may be invoked and run in real time or faster than real time to determine whether the power system will remain stable under the remedial actions.

The DGL 120 includes a disturbance-free data case module 122, a pre-defined disturbances module 124, and an instant-input disturbances module 126. When there is no disturbance in the power system, the DGL 120 may simply provide data from the disturbance-free data case module 122 to the SEL 110. The DGL 120 may also provide disturbances, which may be user-defined or randomly generated from the pre-defined disturbances module 124, to mimic the possible power system disturbances of various categories. When a real disturbance takes place in the power system, such a disturbance may be input (e.g., based on information from the AL 130 or input from an operator) in the DGL 120 via the instant-input disturbances module 126. Therefore, information and signals from the DGL 120 are needed by the SEL 110 to alter the output from the simulation engine to simulate the behavior of the power system in real time or faster than real time, such that the stability of the power system may be monitored and ensured.

The AL 130 may include a state estimator module 132, a contingency screening module 134, a visualization module 136, and/or a control module 138. The state estimator module 132 may monitor the state of the power system and may enable, for example, an energy management system to perform control and planning tasks such as establishing near real-time network models for the power system, optimizing power flows, etc. The state estimator module 132 thus may provide input information to the DGL 120 and the SEL 110. The contingency screening module 134 may include screening algorithms that may be used in conjunction with the SEL 110 and the DGL 120 to detect contingencies that result in violations. The visualization module 136 may be used to display, on one or more displays or monitors, live simulations or recorded simulation results from the SEL 110 to operators and/or users of the power system. The control module 138 may encompass and/or communicate with software and/or hardware controllers, such as automatic generation control (AGC), to automatically or manually control devices/equipment such as generators, transformers, switches, capacitors, transmission lines, power-consuming loads, etc. in the power system. For example, the control module 138 may control a generator to ramp up its power output in order to support another generator that may have failed or put out of service for maintenance. Switches may be opened to isolate broken transmission lines or closed to bring transmission lines back online. Power-consuming loads may be put offline by opening switches when power generated is insufficient for power demand. Capacitors may be switched in or out to meet reactive power demand.

While there may be more than one ways to remedy a disturbance (e.g., when a generator fails, either the power output of another generator may be increased or power-consuming load may be shed), it is the duty of an operator to keep the power system stable while minimizing interruption of power supply. It is, therefore, desirable for an operator to be able to simulate, visualize, and analyze multiple remedial scenarios before choosing the most effective scenario and controlling appropriate pieces of equipment in the power system, via the control module 138 for example, to isolate the disturbance, and all this before the power system has the chance to go unstable. In other words, it is imperative for the SEL 110, the DGL 120, the AL 130, and the modules within themselves to share information/data among one another in real time or faster than real time.

However, the SEL 110, the DGL 120, the AL 130, and their modules may not communicate directly and readily with one another because they each may use proprietary data formats and communication protocols. For example, disturbance data from the DGL 120 may be in a format that may not be readily input into the power flow calculation module 112, or simulation results may not be compatible with the visualization tool(s) used by the visualization module 136 or may not be in the format required by the software and/or hardware controllers of the control module 138 to generate control signals to devices/equipment of the power system. Therefore, the server 140 is provided to overcome these shortcomings and allow these three layers and their modules to interoperate. The server may enable, in real time or faster than real time, point-to-point communication or broadcasting of information among the modules and management of the tasks to be performed by the modules such that the operator of the power system is able to assess the effect of a disturbance, analyze a set of remedial actions, and take the most appropriate control step to maintain the stability of the power system.

As can be seen in FIG. 1, the server 140 may be coupled to and may provide bidirectional data flow with the SEL 110, the DGL 120, and the AL 130. The server 140 may include, but is not limited to, a connect/disconnect module 142, a manage clients module 133, a format converter module 146, a broadcast variable module 148, and a send variable module 149.

The connect/disconnect module 142 allows the server 140 to connect to and disconnect from any of the modules 112-138, which the server may treat as clients. Through the connect/disconnect module 142, the server 140 may accept connections from modules 112-138 through Inter Process Communication (IPC) or Transmission Control Protocol (TCP), which may be automatically chosen based on the detected connection quality with the corresponding modules. Using the client manager module 144, the server 140 may prioritize tasks that are to be undertaken by each of the modules 112-138. For example, following a disturbance, the power flow calculation module 112 may need to be run prior to the time-domain virtual grid simulation module 114. However, for example, the time-domain virtual grid simulation module 114 and the visualization module 136 may run concurrently such that results from the time-domain virtual grid simulation module 114 may be displayed as they are generated. The manage clients module 144 may maintain and update a list of connected clients, which may be running in different programming environments, such as MATLAB and Python.

The server 140 may invoke the format converter 146 whenever data from one module needs to be converted from one format to another before being sent to another module. The broadcast variable module 148 allows the server 140 to send a variable or information to all the modules 112-138 simultaneously, while the send variable module 149 allows the server to send a variable or information to a specific module. In certain embodiment, for example, the server 140 may de-serialize streamed data from different environments if the data from the client environment is not JavaScript Object Notation (JSON)-encoded, and may encode raw data with JSON. On the other hand, the clients may encode data with JSON before streaming the data to the server 140. Additionally, the server 140 may utilize a common data exchange format and a standardized control message format.

Given that the controller 100 may be accessed through a GUI, for example, the controller 100 may initiate a continuous time-domain simulation upon the receiving of start command from an operator and keep running the simulation until a pause or a termination signal is received. During a simulation session, the controller 100 may dispatch one or more of the modules 132-138 of the AL 130, providing the operator with an interactive interface for system security assessment and real-time comprehensive visualization of system status (using geographical view and contour maps, for example). Through the GUI, the operator may continually adjust parameters of devices/equipment in the simulation tools in a simulation session as time progresses. The operator may interactively change parameter settings using a filter panel to locate device models within one or more categories, including generation control devices, monitoring devices, system topological devices, and load devices. Also, the controller 100 may provide a filter panel for the user to select a disturbance within one or more categories, including load variation, generation outage, transmission line outage, transformer outage, etc.

Moreover, the controller 100 may provide real-time detailed visualization of system variables during a simulation session using figure plotting in a webpage loaded by a web browser that allows for filter-based variable selection. The system data variables, operator's assessment results, and control outputs over the course of the simulation after pausing or stopping the session may be stored in the common exchange format. The stored simulation may be reloaded and visualization may be run in playback mode.

Figure 2:
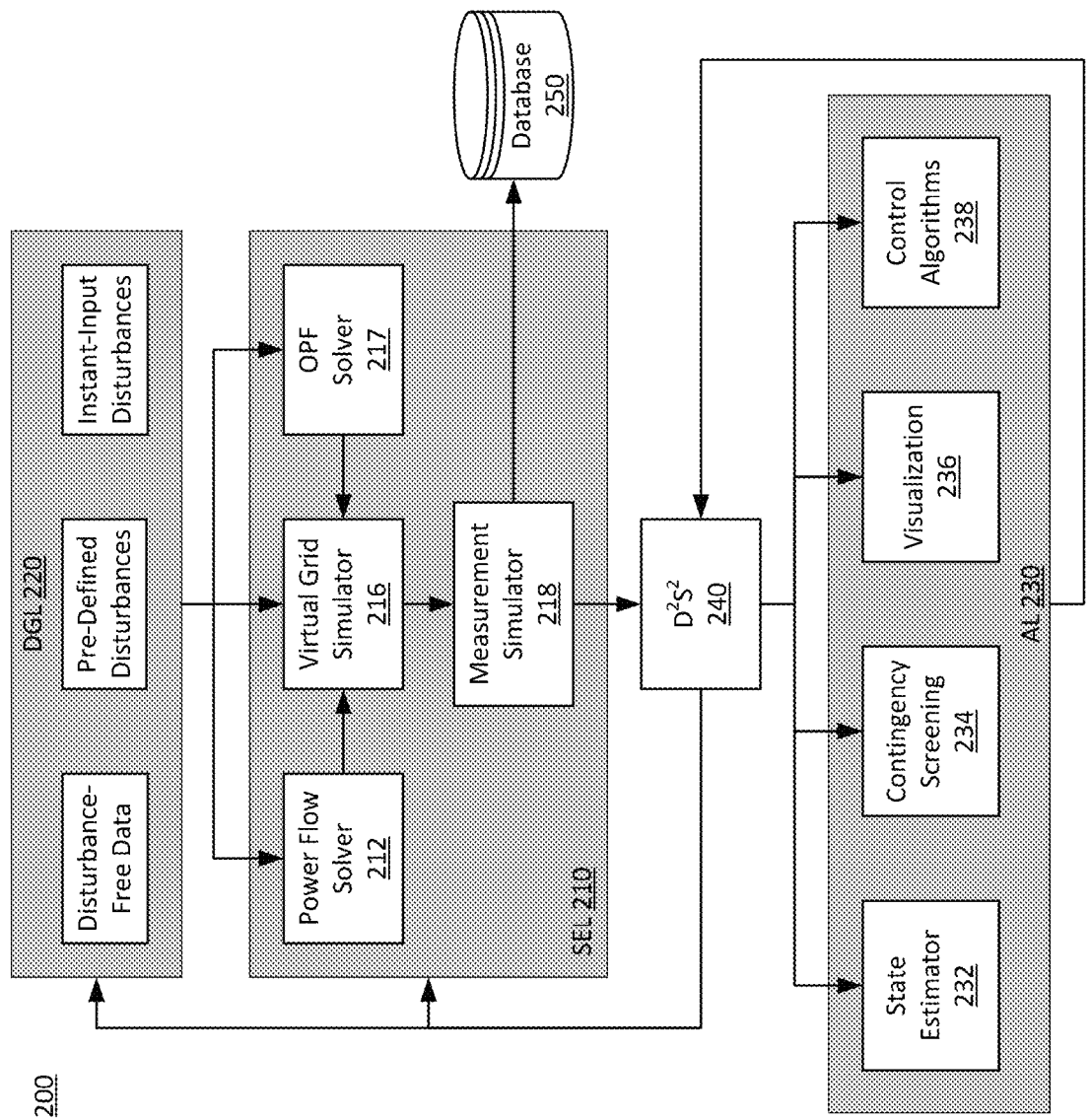
FIG. 2 illustrates an exemplary program workflow of the $D^2S^2$-based power system real-time simulator and controller according to an embodiment of the present disclosure.

FIG. 2 illustrates an exemplary program workflow 200 of the controller 100 according to an embodiment of the present disclosure. Disturbance data (i.e., disturbance-free data, pre-defined disturbances, and instant-input disturbances, as explained above) from a DGL 220 and system settings data may be parsed to an SEL 210. In the SEL 210, a power flow solver 212 and/or an optimal power flow (OPF) solver 217 may receive the parsed data and may run power flow simulation to generate initial conditions for time-domain simulations run by a virtual grid simulator 216. In other words, dynamic components are initialized in the SEL 210 with initial power flow results and are then simulated in time-domain by the virtual grid simulator 216.

Algebraic variables and state variables generated by the virtual grid simulator 216 may then be passed through a measurement simulator 218 in the SEL 210. The measurement simulator 218 may embed field measurement noises and errors into the algebraic variables and state variables, such that the simulation results are as realistic as possible. The resulting simulation data may be stored in a database 250 and may be accessed by operators of the power system for further review and analyses. The simulated measurement data may be streamed through a $D^2S^2$ 240 (hereinafter the "server 240") to application modules in an AL 230 over TCP or IPC protocol. The application modules may include a state estimator 232, a contingency screening 234, a visualization tool 236, and control algorithms 238 to control devices/equipment in the power system. Data/information and control variables from the control modules may be streamed back via the server 240 to the SEL 210 and the DGL 220, where the system parameters are updated accordingly, such that updated simulations may be run in real time or faster than real time.

It is to be appreciated that the controller 100 may be run by a computer system including a plurality of processors. The computer system may include secondary or tertiary storage to allow for non-volatile or volatile storage of instructions to be executed by the plurality of processors to run the controller 100, and for storage of the simulation results, the disturbance data, control variables, the operator's assessments, etc. The computer system may also include one or more display units to display and compare simultaneously the time-domain simulation results (or data from any of the other modules) for analysis and review by the operator, allowing the latter to study and analyze faster than real time the performances of a plurality of possible remedial scenarios following a contingency. As a result, via the computer system or a separate control unit, the operator may take the most effective and timely remedial action by controlling one or more pieces of equipment in the power system. It is also to be appreciated that the elements in the controller 100 are extendable and interoperable. For example, as long as the common data format and interfaces provided by the server 140 are supported, new applications may be linked to the AL 130 or the time-domain virtual grid simulation module 116 may be swapped by a new virtual grid simulation tool. The computer system may be entirely contained at one location or may also be implemented across a closed or local network, a cluster of directly connected computers, an internet-centric network, or a cloud platform in synchronous or asynchronous manner. It is to be further appreciated that the controller 100 is not limited to any particular programming language or execution environment, and may be applied to any computer programming languages or logic.

Embodiments of the disclosure are specifically illustrated and/or described herein. However, it will be appreciated that modifications and variations of the disclosure are covered by the above teachings and within the purview of the appended claims without departing from the spirit and intended scope of the disclosure. Further variations that are consistent with the principles described above are permissible.

What is claimed is:

1. A controller for a power system, comprising:
   a simulation layer configured to simulate an operation of the power system, the simulation layer comprising a power flow module;
   a disturbance generation layer configured to provide disturbance data to the power flow module of the simulation layer, the power flow module being configured to generate initial conditions and initial power flow results for the power system based on the disturbance data, the simulation layer being further configured to simulate the operation of the power system in a destabilized state responsive to the initial conditions and the initial power flow results for the power system;
   an application layer configured to display the simulated operation of the power system and configured to generate a control signal to control, based on the simulated operation of the power system, one or more elements of the power system; and
   a server configured to allow interoperability among the simulation layer, the disturbance layer, and the application layer;
   wherein the disturbance data provided by the disturbance generation layer comprises artificial disturbance data and real disturbance data from the power system, the real disturbance data being provided in real time; and
   wherein the server is further configured to connect to one or more of the simulation layer, the disturbance layer, and the application layer through at least one of Inter Process Communication (IPC) and Transmission Control Protocol (TCP), based on a connection quality with the corresponding layer.

2. The controller of claim 1, wherein the one or more elements of the power system includes a generator, a switch, a transformer, a transmission line, or a power-consuming load.

3. The controller of claim 1, wherein the server is further configured to convert one or more formats of information from one or more of the simulation layer, the disturbance layer, and the application layer to a common data exchange format.

4. The controller of claim 1, wherein the server is further configured to encode information that the server transmits to the simulation layer, the disturbance layer, and the application layer into a standardized format.

5. The controller of claim 1, wherein the artificial disturbance data is randomly generated from a set of pre-defined disturbance data.

6. A power system, comprising:
   a plurality of elements, comprising:
     at least one generator;
     at least one transformer;
     at least one switch;
     at least one transmission line; and
     at least one power-consuming load; and
   a controller comprising:
     a simulation layer configured to simulate an operation of the power system, the simulation layer comprising a power flow module;
     a disturbance generation layer configured to provide disturbance data to the power flow module of the simulation layer, the power flow module being configured to generate initial conditions and initial power flow results for the power system based on the disturbance data, the simulation layer being further configured to simulate the operation of the power system in a destabilized state responsive to the initial conditions and the initial power flow results for the power system;
     an application layer configured to display the simulated operation of the power system and configured to generate a control signal to control, based on the simulated operation of the power system, one or more of the plurality of elements; and
     a server configured to allow interoperability among the simulation layer, the disturbance layer, and the application layer;
   wherein the disturbance data provided by the disturbance generation layer comprises artificial disturbance data and real disturbance data from the power system, the real disturbance data being provided in real time; and
   wherein the server is further configured to connect to one or more of the simulation layer, the disturbance layer, and the application layer through at least one of Inter Process Communication (IPC) and Transmission Control Protocol (TCP), based on a connection quality with the corresponding layer.

7. The system of claim 6, wherein the server is further configured to convert formats of information from the simulation layer, the disturbance layer, and the application layer to a common data exchange format.

8. The system of claim 6, wherein the server is further configured to encode information that the server transmits to the simulation layer, the disturbance layer, and the application layer into a standardized format.

9. The system of claim 6, wherein the artificial disturbance data is randomly generated from a set of pre-defined disturbance data.

10. A method for controlling a power system, the power system comprising a plurality of elements comprising a generator, a switch, a transformer, a transmission line, and a power-consuming load, the method comprising:
   simulating, in a simulation layer of a controller, an operation of the power system;
   providing disturbance data from a disturbance generation layer of the controller to the simulation layer;
   generating, in a power flow module of the simulation layer, initial conditions and initial power flow results for the power system based on the disturbance data;
   simulating, in the simulation layer, the operation of the power system in a destabilized state responsive to the initial conditions and the initial power flow results for the power system;
   controlling, through an application layer of the controller and based on the simulated operation of the power system, one or more of the plurality of elements; and
   coordinating interoperability among the simulation layer, the disturbance generation layer, and the application layer via a server of the controller;
   connecting the server to one or more of the simulation layer, the disturbance layer, and the application layer through at least one of Inter Process Communication (IPC) and Transmission Control Protocol (TCP), based on a connection quality between the server and the corresponding layer;

wherein the disturbance data comprises artificial disturbance data and real disturbance data from the power system; and wherein providing the disturbance data comprises providing the real disturbance data in real time.

11. The method of claim 10, further comprising converting, using the server, formats of information from the simulation layer, the disturbance layer, and the application layer to a common data exchange format.

12. The method of claim 10, further comprising encoding, using the server, information that the server transmits to the simulation layer, the disturbance layer, and the application layer into a standardized format.

13. The method of claim 10, wherein the disturbance data provided from the disturbance generation layer comprises artificial disturbance data and real disturbance data from the power system.

14. The method of claim 10, wherein the artificial disturbance data is randomly generated from a set of pre-defined disturbance data.

* * * * *